US012588976B2

(12) United States Patent　　　　　(10) Patent No.:　US 12,588,976 B2
MOss et al.　　　　　　　　　　　　(45) Date of Patent:　　Mar. 31, 2026

(54) METHODS OF FORMING DENTAL APPLIANCES WITH REINFORCEMENT RIBS

(71) Applicant: Align Technology, Inc., San Jose, CA (US)

(72) Inventors: Jon F. MOss, Antioch, CA (US); Louis D. Marzano, Palo Alto, CA (US); Eric E. Kuo, San Jose, CA (US); Kelsey D. Wirth, Cambridge, MA (US)

(73) Assignee: Align Technology, Inc., San Jose, CA (US)

( * ) Notice: Subject to any disclaimer, the term of this patent is extended or adjusted under 35 U.S.C. 154(b) by 515 days.

(21) Appl. No.: 17/338,542

(22) Filed: Jun. 3, 2021

(65) Prior Publication Data

US 2021/0290342 A1　　Sep. 23, 2021

Related U.S. Application Data

(62) Division of application No. 12/152,188, filed on May 13, 2008, now Pat. No. 11,026,768.

(51) Int. Cl.
　　*A61C 7/08*　　　　(2006.01)
　　*A61C 7/00*　　　　(2006.01)
　　*A61C 9/00*　　　　(2006.01)
　　*A61C 13/00*　　　(2006.01)
(52) U.S. Cl.
　　CPC ................. *A61C 7/08* (2013.01); *A61C 7/00* (2013.01); *A61C 9/00* (2013.01); *A61C 7/002* (2013.01); *A61C 13/0004* (2013.01)

(58) Field of Classification Search
　　CPC .... A61C 7/00; A61C 7/08; A61C 7/10; A61C 7/24
　　See application file for complete search history.

(56) References Cited

U.S. PATENT DOCUMENTS

| | | | | |
|---|---|---|---|---|
| 4,479,779 | A | * | 10/1984 | Wool ....................... A61C 7/20 |
| | | | | 433/20 |
| 5,820,368 | A | | 10/1998 | Wolk |
| 6,200,135 | B1 | | 3/2001 | Hultgren |
| 6,210,162 | B1 | | 4/2001 | Chishti et al. |
| 6,386,864 | B1 | | 5/2002 | Kuo |
| 6,454,565 | B2 | | 9/2002 | Phan et al. |
| 6,783,604 | B2 | | 8/2004 | Tricca |
| 6,790,035 | B2 | | 9/2004 | Tricca et al. |
| 6,947,038 | B1 | | 9/2005 | Anh et al. |

(Continued)

*Primary Examiner* — Edward Moran
(74) *Attorney, Agent, or Firm* — Shay Glenn LLP

(57)　　　　　　ABSTRACT

Methods of forming dental appliances with reinforcement ribs. Methods may include forming virtual ribs on a virtual dental appliance. The virtual ribs may be formed laterally across at least a portion of a lingual surface and a labial surface of the virtual dental appliance. A thickness from rib to rib of the virtual ribs may vary such that thicker one or more ribs are arranged to apply greater force in the one or more desired directions. Methods may include calculating a displacement of the one or more teeth of a virtual teeth model based on forces applied by the virtual dental appliance. The displacement may account for changes in the forces applied on the one or more teeth of the virtual teeth model that the virtual ribs provide. Methods may include forming a dental appliance from a polymeric material based upon the virtual dental appliance.

16 Claims, 9 Drawing Sheets

(56)  References Cited

U.S. PATENT DOCUMENTS

| | | | |
|---|---|---|---|
| 7,074,039 B2 | 7/2006 | Kopelman et al. |
| 7,104,792 B2 | 9/2006 | Taub et al. |
| 7,121,825 B2 | 10/2006 | Chishti et al. |
| 7,160,107 B2 | 1/2007 | Kopelman et al. |
| 7,347,688 B2 | 3/2008 | Kopelman et al. |
| 7,448,514 B2 | 11/2008 | Wen |
| 7,481,121 B1 | 1/2009 | Cao |
| 7,543,511 B2 | 6/2009 | Kimura et al. |
| 7,600,999 B2 | 10/2009 | Knopp |
| 7,658,610 B2 | 2/2010 | Knopp |
| 7,766,658 B2 | 8/2010 | Tricca et al. |
| 7,771,195 B2 | 8/2010 | Knopp et al. |
| 7,871,269 B2 | 1/2011 | Wu et al. |
| 7,883,334 B2 | 2/2011 | Li et al. |
| 7,914,283 B2 | 3/2011 | Kuo |
| 8,235,715 B2 | 8/2012 | Kuo |
| 8,292,617 B2 | 10/2012 | Brandt et al. |
| 8,337,199 B2 | 12/2012 | Wen |
| 8,401,686 B2 | 3/2013 | Moss et al. |
| 8,517,726 B2 | 8/2013 | Kakavand et al. |
| 8,562,337 B2 | 10/2013 | Kuo et al. |
| 8,641,414 B2 | 2/2014 | Borovinskih et al. |
| 8,684,729 B2 | 4/2014 | Wen |
| 8,708,697 B2 | 4/2014 | Li et al. |
| 8,758,009 B2 | 6/2014 | Chen et al. |
| 8,899,977 B2 | 12/2014 | Cao et al. |
| 8,936,463 B2 | 1/2015 | Mason et al. |
| 8,936,464 B2 | 1/2015 | Kopelman |
| 9,022,781 B2 | 5/2015 | Kuo et al. |
| 9,119,691 B2 | 9/2015 | Namiranian et al. |
| 9,161,823 B2 | 10/2015 | Morton et al. |
| 9,326,831 B2 | 5/2016 | Cheang |
| 9,433,476 B2 | 9/2016 | Khardekar et al. |
| 9,610,141 B2 | 4/2017 | Kopelman et al. |
| 9,655,691 B2 | 5/2017 | Li et al. |
| 9,675,427 B2 | 6/2017 | Kopelman |
| 9,700,385 B2 | 7/2017 | Webber |
| 9,744,001 B2 | 8/2017 | Choi et al. |
| 9,844,424 B2 | 12/2017 | Wu et al. |
| 10,045,835 B2 | 8/2018 | Boronkay et al. |
| 10,111,730 B2 | 10/2018 | Webber et al. |
| 10,150,244 B2 | 12/2018 | Sato et al. |
| 10,201,409 B2 | 2/2019 | Mason et al. |
| 10,213,277 B2 | 2/2019 | Webber et al. |
| 10,299,894 B2 | 5/2019 | Tanugula et al. |
| 10,363,116 B2 | 7/2019 | Boronkay |
| 10,383,705 B2 | 8/2019 | Shanjani et al. |
| D865,180 S | 10/2019 | Bauer et al. |
| 10,449,016 B2 | 10/2019 | Kimura et al. |
| 10,463,452 B2 | 11/2019 | Matov et al. |
| 10,470,847 B2 | 11/2019 | Shanjani et al. |
| 10,492,888 B2 | 12/2019 | Chen et al. |
| 10,517,701 B2 | 12/2019 | Boronkay |
| 10,537,406 B2 | 1/2020 | Wu et al. |
| 10,537,463 B2 | 1/2020 | Kopelman |
| 10,548,700 B2 | 2/2020 | Fernie |
| 10,555,792 B2 | 2/2020 | Kopelman et al. |
| 10,588,776 B2 | 3/2020 | Cam et al. |
| 10,613,515 B2 | 4/2020 | Cramer et al. |
| 10,639,134 B2 | 5/2020 | Shanjani et al. |
| 10,743,964 B2 | 8/2020 | Wu et al. |
| 10,758,323 B2 | 9/2020 | Kopelman |
| 10,781,274 B2 | 9/2020 | Liska et al. |
| 10,813,720 B2 | 10/2020 | Grove et al. |
| 10,874,483 B2 | 12/2020 | Boronkay |
| 10,881,487 B2 | 1/2021 | Cam et al. |

| | | | |
|---|---|---|---|
| 10,912,629 B2 | 2/2021 | Tanugula et al. |
| 10,959,810 B2 | 3/2021 | Li et al. |
| 10,993,783 B2 | 5/2021 | Wu et al. |
| 11,026,831 B2 | 6/2021 | Kuo |
| 11,045,282 B2 | 6/2021 | Kopelman et al. |
| 11,045,283 B2 | 6/2021 | Riley et al. |
| 11,103,330 B2 | 8/2021 | Webber et al. |
| 11,123,156 B2 | 9/2021 | Cam et al. |
| 11,154,382 B2 | 10/2021 | Kopelman et al. |
| 11,166,788 B2 | 11/2021 | Webber |
| 11,174,338 B2 | 11/2021 | Liska et al. |
| 2002/0192617 A1* | 12/2002 | Phan ................... A61C 19/003 |
| | | | 433/18 |
| 2004/0166462 A1 | 8/2004 | Phan et al. |
| 2005/0014105 A1 | 1/2005 | Abolfathi et al. |
| 2005/0079468 A1* | 4/2005 | Chishti ................. B33Y 80/00 |
| | | | 433/24 |
| 2005/0244768 A1 | 11/2005 | Taub et al. |
| 2006/0019218 A1 | 1/2006 | Kuo |
| 2006/0078841 A1 | 4/2006 | Desimone et al. |
| 2006/0115782 A1 | 6/2006 | Li et al. |
| 2006/0199142 A1 | 9/2006 | Liu et al. |
| 2006/0199153 A1* | 9/2006 | Liu ...................... A61C 8/0089 |
| | | | 433/213 |
| 2008/0118882 A1 | 5/2008 | Su |
| 2008/0160473 A1 | 7/2008 | Li et al. |
| 2008/0268398 A1* | 10/2008 | Cantarella ................ A61C 7/20 |
| | | | 433/20 |
| 2008/0286716 A1 | 11/2008 | Sherwood |
| 2008/0286717 A1 | 11/2008 | Sherwood |
| 2009/0280450 A1 | 11/2009 | Kuo |
| 2010/0055635 A1 | 3/2010 | Kakavand |
| 2010/0129763 A1 | 5/2010 | Kuo |
| 2011/0269092 A1 | 11/2011 | Kuo et al. |
| 2014/0067334 A1 | 3/2014 | Kuo |
| 2015/0265376 A1 | 9/2015 | Kopelman |
| 2015/0366638 A1 | 12/2015 | Kopelman et al. |
| 2016/0193014 A1 | 7/2016 | Morton et al. |
| 2016/0242870 A1 | 8/2016 | Matov et al. |
| 2016/0242871 A1 | 8/2016 | Morton et al. |
| 2017/0007359 A1 | 1/2017 | Kopelman et al. |
| 2017/0007360 A1 | 1/2017 | Kopelman et al. |
| 2017/0007361 A1 | 1/2017 | Boronkay et al. |
| 2017/0007386 A1 | 1/2017 | Mason et al. |
| 2019/0000592 A1 | 1/2019 | Cam et al. |
| 2019/0000593 A1 | 1/2019 | Cam et al. |
| 2019/0029775 A1 | 1/2019 | Morton et al. |
| 2019/0125497 A1 | 5/2019 | Derakhshan et al. |
| 2019/0152152 A1 | 5/2019 | O'Leary et al. |
| 2019/0175304 A1 | 6/2019 | Morton et al. |
| 2019/0231477 A1 | 8/2019 | Shanjani et al. |
| 2019/0262101 A1 | 8/2019 | Shanjani et al. |
| 2019/0298494 A1 | 10/2019 | Webber et al. |
| 2019/0314119 A1 | 10/2019 | Kopelman et al. |
| 2019/0343606 A1 | 11/2019 | Wu et al. |
| 2020/0000553 A1 | 1/2020 | Makarenkova et al. |
| 2020/0086553 A1 | 3/2020 | Mojdeh et al. |
| 2020/0100864 A1 | 4/2020 | Wang et al. |
| 2020/0100865 A1 | 4/2020 | Wang et al. |
| 2020/0100866 A1 | 4/2020 | Medvinskaya et al. |
| 2020/0100871 A1 | 4/2020 | Wang et al. |
| 2020/0155276 A1 | 5/2020 | Cam et al. |
| 2020/0188062 A1 | 6/2020 | Kopelman et al. |
| 2020/0214598 A1 | 7/2020 | Li et al. |
| 2020/0214801 A1 | 7/2020 | Wang et al. |
| 2020/0390523 A1 | 12/2020 | Sato et al. |
| 2021/0078357 A1 | 3/2021 | Venkatasanthanam et al. |
| 2021/0147672 A1 | 5/2021 | Cole et al. |

* cited by examiner

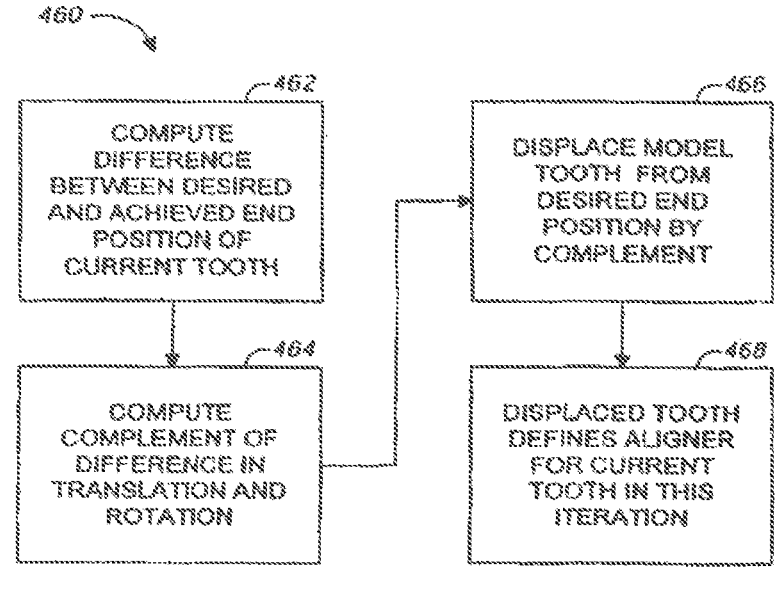
*460*
*462*
COMPUTE DIFFERENCE BETWEEN DESIRED AND ACHIEVED END POSITION OF CURRENT TOOTH
*466*
DISPLACE MODEL TOOTH FROM DESIRED END POSITION BY COMPLEMENT
*464*
COMPUTE COMPLEMENT OF DIFFERENCE IN TRANSLATION AND ROTATION
*468*
DISPLACED TOOTH DEFINES ALIGNER FOR CURRENT TOOTH IN THIS ITERATION
FIG. 5B
*465*
TO MOVE TOOTH ALONG ITS AXIS, CHANGE SIZE OF MODEL TOOTH DEFINING ALIGNER
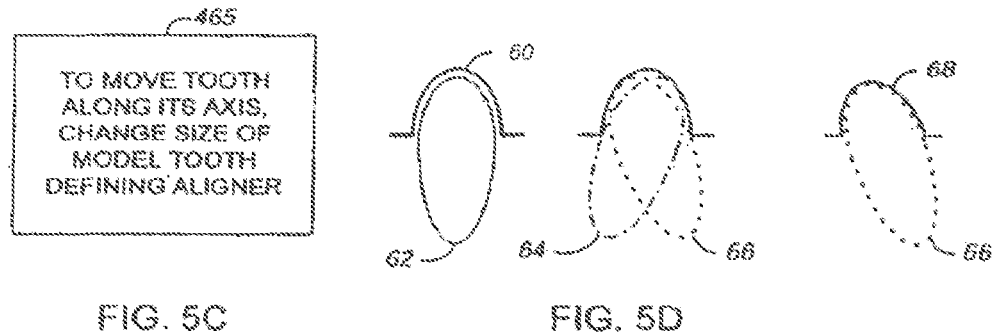
FIG. 5C                    FIG. 5D

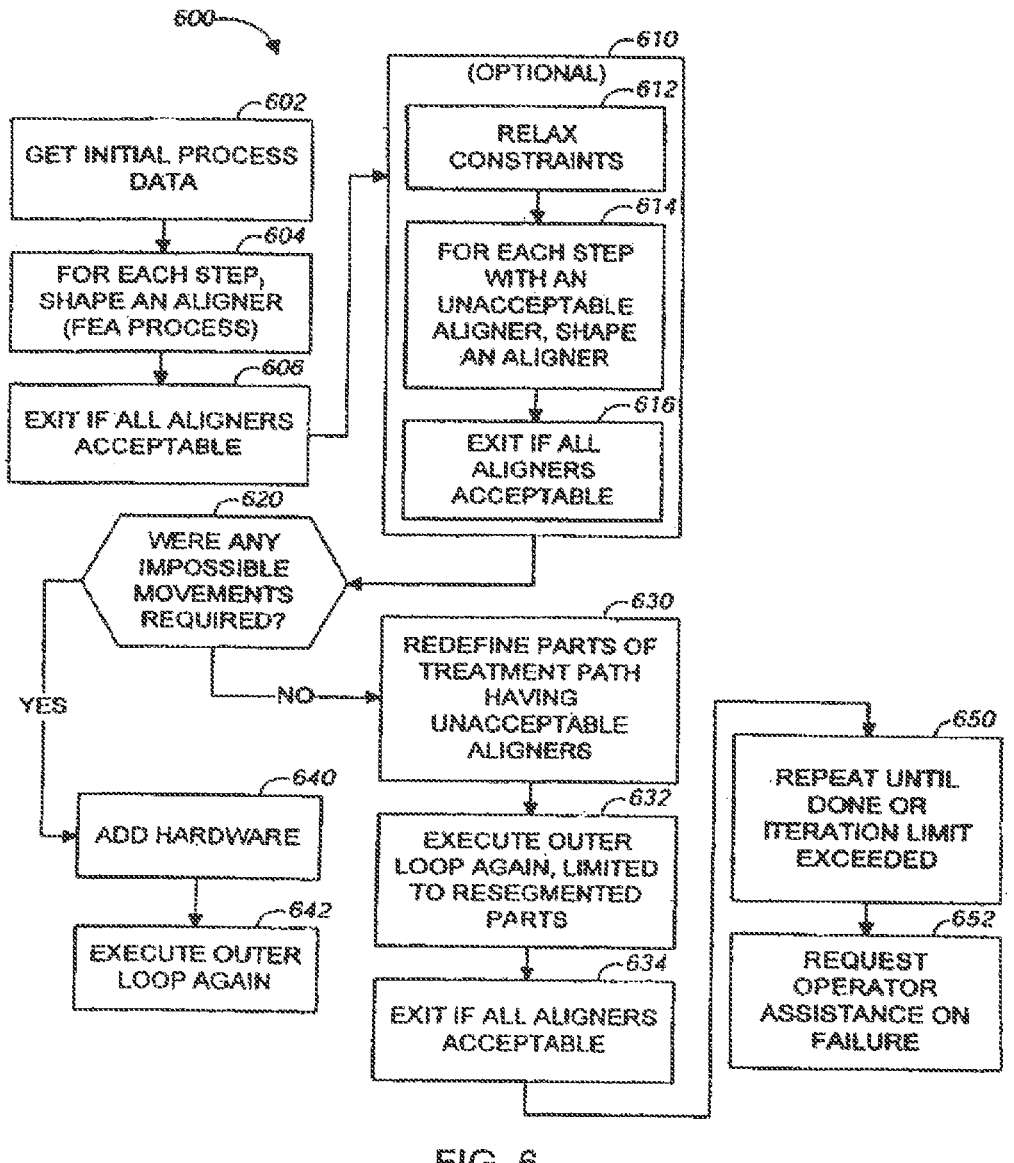

*600*

*602*
GET INITIAL PROCESS DATA

*604*
FOR EACH STEP, SHAPE AN ALIGNER (FEA PROCESS)

*606*
EXIT IF ALL ALIGNERS ACCEPTABLE

*610*
(OPTIONAL)

*612*
RELAX CONSTRAINTS

*614*
FOR EACH STEP WITH AN UNACCEPTABLE ALIGNER, SHAPE AN ALIGNER

*616*
EXIT IF ALL ALIGNERS ACCEPTABLE

*620*
WERE ANY IMPOSSIBLE MOVEMENTS REQUIRED?

*630*
REDEFINE PARTS OF TREATMENT PATH HAVING UNACCEPTABLE ALIGNERS

YES

NO

*640*
ADD HARDWARE

*642*
EXECUTE OUTER LOOP AGAIN

*632*
EXECUTE OUTER LOOP AGAIN, LIMITED TO RESEGMENTED PARTS

*634*
EXIT IF ALL ALIGNERS ACCEPTABLE

*650*
REPEAT UNTIL DONE OR ITERATION LIMIT EXCEEDED

*652*
REQUEST OPERATOR ASSISTANCE ON FAILURE

FIG. 6

METHODS OF FORMING DENTAL APPLIANCES WITH REINFORCEMENT RIBS

CROSS REFERENCE TO RELATED APPLICATIONS

The present application is a division of U.S. patent application Ser. No. 12/152,188, filed on May 13, 2008, titled "DENTAL APPLIANCE REINFORCEMENT," now U.S. Pat. No. 11,026,768, which is herein incorporated by reference in its entirety.

INCORPORATION BY REFERENCE

All publications and patent applications mentioned in this specification are incorporated herein by reference in their entirety to the same extent as if each individual publication or patent application was specifically and individually indicated to be incorporated by reference.

BACKGROUND

The present disclosure relates generally to dental treatment. In some types of dental treatment, a patient's teeth can be moved from an initial to a final position using any of a variety of appliances. An appliance can be used to exert force on the teeth by which one or more of them are moved or held in place, as appropriate to the stage of treatment.

In some instances, the appliance may lose some of its ability to impart force due to a relaxation of the materials used to form the appliance. Such relaxation may be due to the application of force over time, may be due to inherent properties in the material, and/or by materials provided in conjunction with or used in parallel with an appliance, among other causes. This relaxation may reduce the effectiveness of the appliance, in some instances.

BRIEF DESCRIPTION OF THE DRAWINGS

The novel features of the invention are set forth with particularity in the claims that follow. A better understanding of the features and advantages of the present invention will be obtained by reference to the following detailed description that sets forth illustrative embodiments, in which the principles of the invention are utilized, and the accompanying drawings of which:

FIG. 1 is a. . . . FIG. 1 is a flowchart of a process of specifying a course of treatment including a subprocess for calculating aligner shapes in accordance with the embodiments of the present disclosure.

FIG. 5B is a flowchart of a subprocess for calculating changes in aligner shape according to an embodiment of the present disclosure.

FIG. 5C is a flowchart of a subprocess for calculating changes in aligner shape according to an embodiment of the present disclosure.

FIG. 5D is a schematic illustrating the operation of the subprocess of FIG. 5B.

FIG. 6 is a flowchart of a process for computing shapes for sets of aligners according to an embodiment of the present disclosure.

DETAILED DESCRIPTION

In the embodiments of the present disclosure, appliances, systems, and methods are provided for defining appliance configurations or changes to appliance configurations for incrementally moving teeth. For example, in some embodiments, the appliance can include one or more ribs that can be provided, for example, to reinforce the structure of at least a portion of the appliance with respect to various forces that may be applied thereto. In some embodiments, the tooth movements can be those normally associated with orthodontic treatment, including translation in three orthogonal directions relative to a vertical centerline, rotation of the tooth centerline in the two orthodontic directions ("root angulation" and "torque"), as well as rotation about the centerline.

Figure 1:
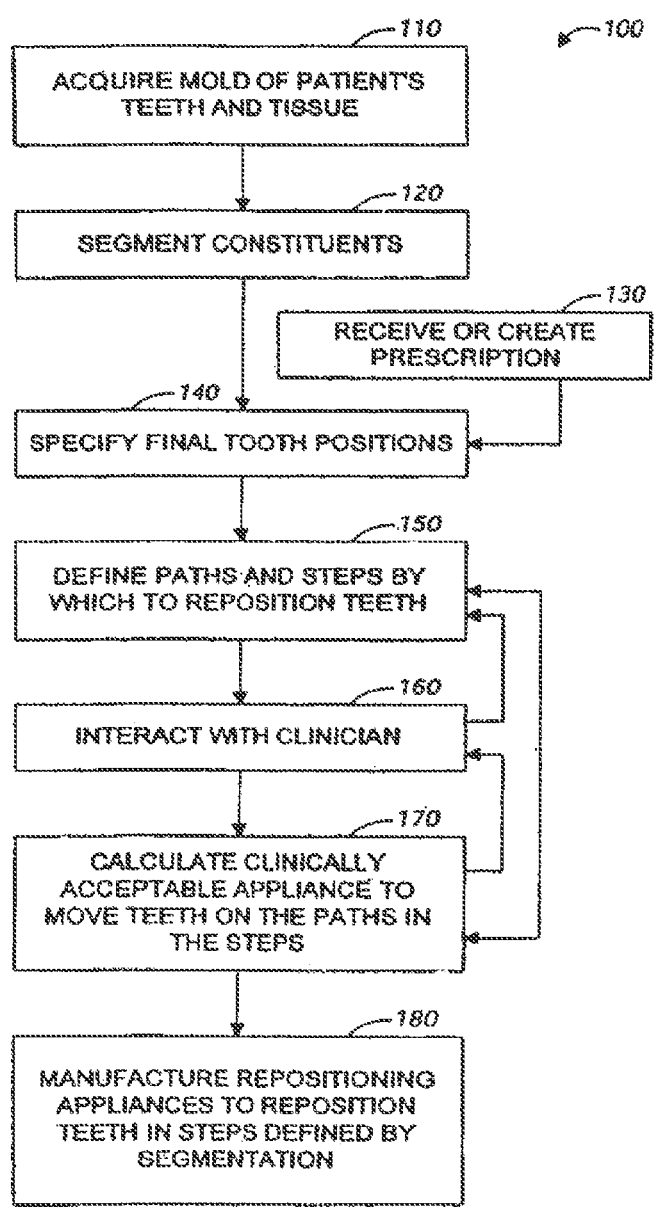

FIG. 1 illustrates the general flow of an example dental process 100 for defining and generating repositioning appliances for orthodontic treatment of a patient. The process 100 includes a method, and is suitable for the apparatus, of embodiments of the present disclosure, as will be described. The computational steps of the process can be advantageously implemented, for example, as computing device program modules for execution on one or more conventional computing devices.

As an initial step, in some embodiments, a mold or a scan of patient's teeth or mouth tissue can be acquired (110). This step can, for example, involve taking one or more casts of one or more of the patient's teeth and/or gums, and may also involve taking wax bites, direct contact scanning, x-ray imaging, tomographic imaging, sonographic imaging, and/or other techniques for obtaining information about the position and structure of the teeth, jaws, gums and/or other orthodontically relevant tissue. From the data so obtained, a digital data set can be derived that represents the initial (e.g., pretreatment) arrangement of the patient's teeth and/or other tissues.

The initial digital data set, which may include both raw data from scanning operations and/or data representing surface models derived from the raw data, can be processed to segment the tissue constituents from each other (step 120). In particular, for example, in this step, data structures that digitally represent individual tooth crowns can be produced. Advantageously, in some embodiments, digital models of entire teeth can be produced, including measured or extrapolated hidden surfaces and root structures.

The desired final position of the teeth, that is, the desired and/or intended end result of orthodontic treatment, can be received from a clinician in the form of a prescription, can be calculated from basic orthodontic principles, and/or can be extrapolated computationally from a clinical prescription (step 130), among other sources of the final position. With a specification of the desired final positions of the teeth and a digital representation of the teeth themselves, the final position and/or surface geometry of each tooth can be specified (step 140) to form a complete model of the teeth at the desired end of treatment. Generally, in this step, the position of every tooth can be specified, in such embodiments. The result of this step is a set of digital data structures that represents an orthodontically correct repositioning of the modeled teeth relative to presumed-stable tissue. In some embodiments, the teeth and tissue are both represented as digital data.

Having both a beginning position and a final position for a tooth, the process next defines a tooth path for the motion of the teeth. The tooth paths can be optimized in the aggregate so that the teeth can be moved in the quickest fashion with the least amount of round-tripping to bring the teeth from their initial positions to their desired final positions. (Round-tripping is any motion of a tooth in any direction other than directly toward the desired final position. Round-tripping is sometimes necessary to allow teeth to move past each other.)

In some processes, the tooth paths are segmented. In such embodiments, the segments are calculated so that each tooth's motion within a segment stays within threshold limits of linear and rotational translation. In this way, the end points of each path segment can constitute a clinically viable repositioning, and the aggregate of segment end points constitute a clinically viable sequence of tooth positions, so that moving from one point to the next in the sequence does not result in a collision of teeth.

In embodiments such as FIG. 1, the threshold limits of linear and rotational translation can be initialized, in one implementation, with default values based on the nature of the appliance to be used. More individually tailored limit values can be calculated using patient-specific data. The limit values can also be updated based on the result of an appliance-calculation (step 170, described later), which may determine that at one or more points along one or more tooth paths, the forces that can be generated by the appliance on the then-existing configuration of teeth and tissue is incapable of effecting the repositioning that is represented by one or more tooth path segments. With this information, the subprocess defining segmented paths (step 150) can recalculate the paths or the affected subpaths.

At various stages of the process, for example, after the segmented paths have been defined, the process can interact with a clinician responsible for the treatment of the patient (step 160). Clinician interaction can be implemented using a client process programmed to receive tooth positions and models, as well as path information from a server computer or process in which other steps of process 100 are implemented. The client process can be advantageously programmed to allow the clinician to display an animation of the positions and paths and to allow the clinician to reset the final positions of one or more of the teeth and to specify constraints to be applied to the segmented paths. If the clinician makes any such changes, the subprocess of defining segmented paths (step 150) can, in some embodiments, be performed again.

The segmented tooth paths and associated tooth position data can be used to calculate clinically acceptable appliance configurations (or successive changes in appliance configuration) that can move the teeth on the defined treatment path in the steps specified by the path segments (step 170). Each appliance configuration represents a step along the treatment path for the patient. The steps can be defined and calculated so that each discrete position can follow by straight-line tooth movement or simple rotation from the tooth positions achieved by the preceding discrete step and so that the amount of repositioning required at each step can involve an orthodontically appropriate amount of force on the patient's dentition. As with the path definition step, this appliance calculation step can include interactions and even iterative interactions with the clinician (step 160). The operation of a process step such as step 200 implementing this calculation step will be described more fully below.

Having calculated appliance definitions, the process 100 can proceed to the manufacturing step (step 180) in which appliances defined by the process are manufactured, or electronic or printed information is produced that can be used by a manual or automated process to define appliance configurations or changes to appliance configurations.

Figure 2:
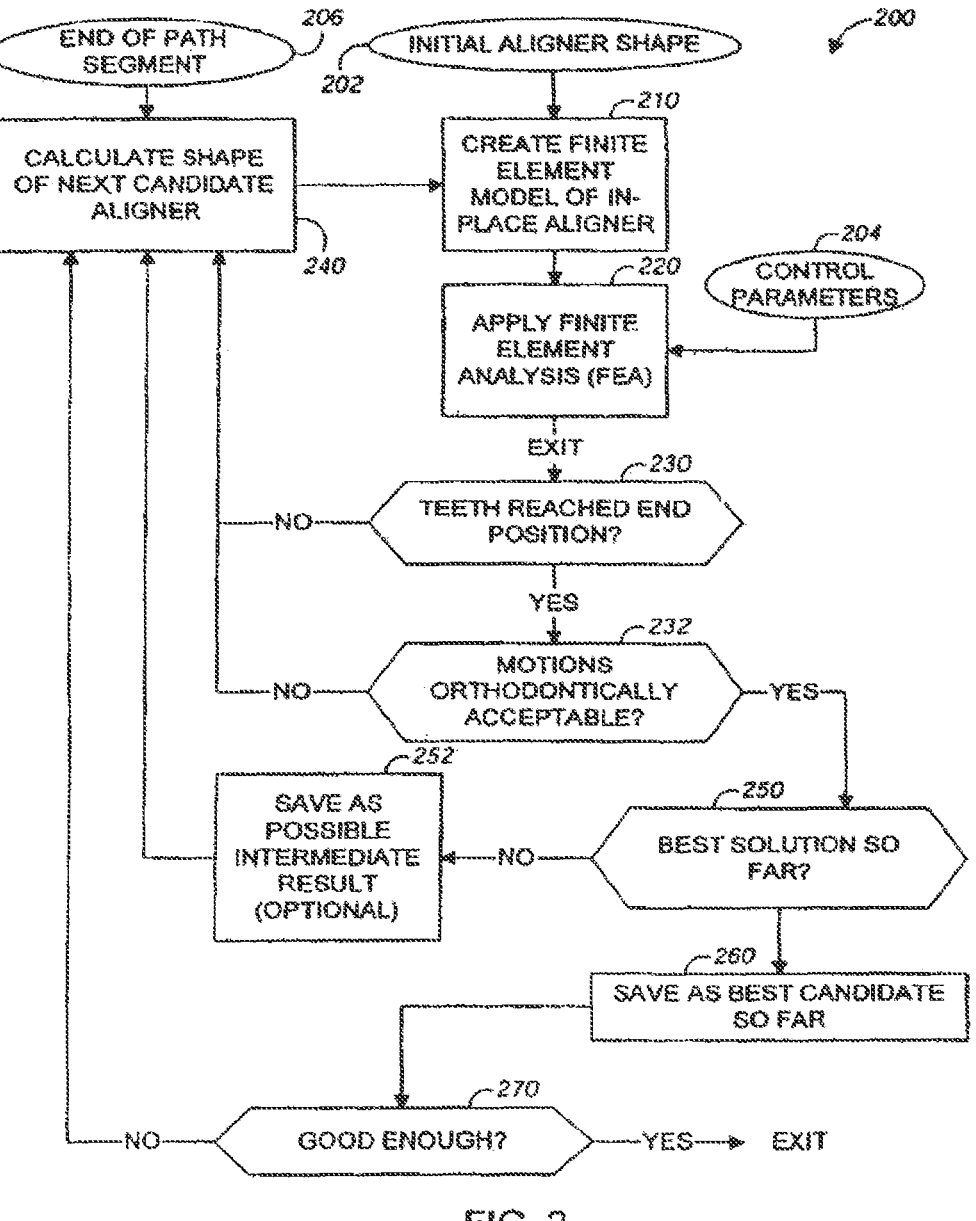
FIG. 2 is a flowchart of a process for calculating aligner shapes according to an embodiment of the present disclosure.

FIG. 2 illustrates a process 200 implementing an appliance-calculation step (FIG. 1, step 170) for polymeric shell aligners of the kind described in U.S. patent application Ser. No. 09/745,825, filed Dec. 21, 2000. Inputs to the process can, for example, include an initial aligner shape 202, various control parameters 204, and a desired end configuration for the teeth at the end of the current treatment path segment 206. Other inputs can include digital models of the teeth in position in the jaw, models of the jaw tissue, and specifications of an initial aligner shape and of the aligner material. Using such input data, the process can create a finite element model of the aligner, teeth, and/or tissue, with the aligner in place on the teeth (step 210). Next, the process can apply a finite element analysis to the composite finite element model of aligner, teeth, and/or tissue (step 220). The analysis can run until an exit condition is reached, at which time, in some embodiments, the process can evaluate whether the teeth have reached the desired end position for the current path segment, or a position sufficiently close to the desired end position (step 230). In such embodiments, if an acceptable end position is not reached by the teeth, the process can, in some instances, calculate a new candidate aligner shape (step 240). If an acceptable end position is reached, in some embodiments, the motions of the teeth can be calculated by the finite elements analysis are evaluated to determine whether they are orthodontically acceptable (step 232). If they are not, in some embodiments, the process also proceeds to calculate a new candidate aligner shape (step 240). If the motions are orthodontically acceptable and the teeth have reached an acceptable position, the current aligner shape is compared to the previously calculated aligner shapes. In various embodiments, if the current shape is determined to be the best solution so far (decision step 250), it can be saved as the best candidate so far (step 260). In some such embodiments, if not, it can be saved in an optional step as a possible intermediate result (step 252). If the current aligner shape is the best candidate so far, the process can be used to determine whether it is good enough to be accepted (decision step 270). If it is, the process exits. Otherwise, the process can continue and calculate another candidate shape (step 240) for analysis.

The finite element models can be created using computer program application software available from a variety of vendors. For creating solid geometry models, computer aided engineering (CAE) or computer aided design (CAD) programs can be used, such as the AutoCAD® software products available from Autodesk, Inc., of San Rafael, California or SolidWorks, discussed below. For creating finite element models and analyzing them, program products from a number of vendors can be used, including the PolyFEM product available from CADSI of Coralville, Iowa, the Pro/Mechanica simulation software available from Parametric Technology Corporation of Needham, Massachusetts, the I-DEAS design software products available from Structural Dynamics Research Corporation (SDRC) of Cincinnati, Ohio, and the MSC/NASTRAN product available from MacNeal-Schwendler Corporation of Los Angeles, California. Other programs that can be utilized in various embodiments include SolidWorks® available from SolidWorks Corporation of Concord, Massachusetts and ProEngineer® available from Parametric Technology Corporation of Needham, Massachusetts, among others.

Figure 3:
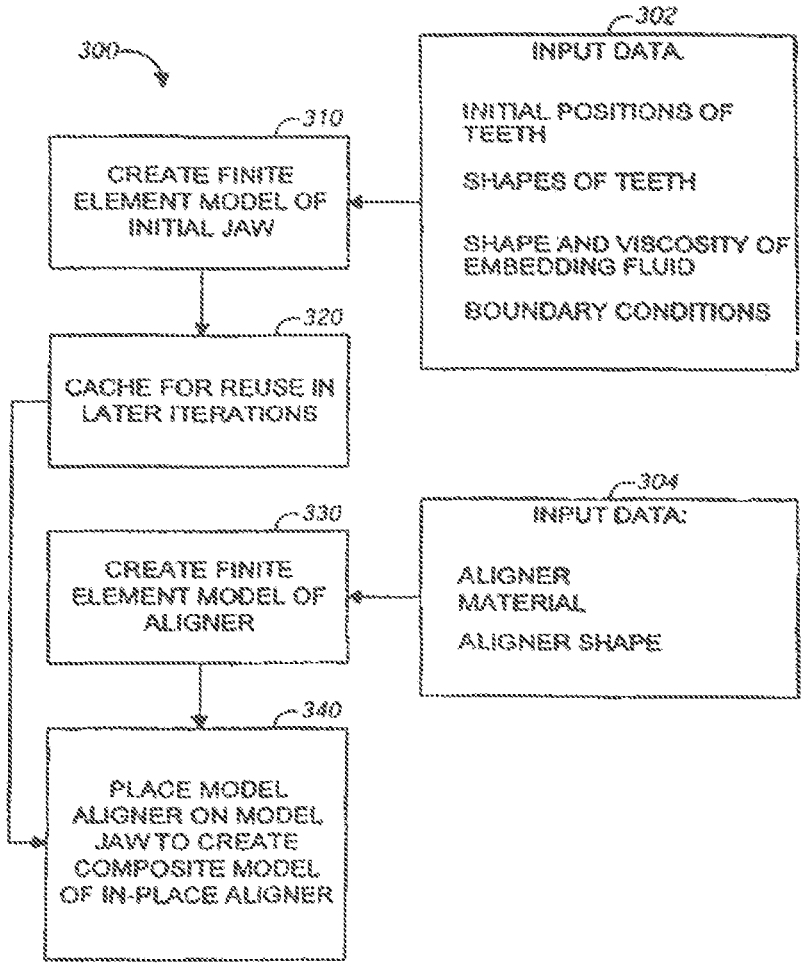
FIG. 3 is a flowchart of a subprocess for creating finite element models according to an embodiment of the present disclosure.

FIG. 3 shows a process 300 of creating a finite element model that can be used to perform step 210 of the process 200 (FIG. 2). In the illustrated embodiment, input to the model creation process 300 includes input data 302 describing the teeth and tissues and input data 304 describing the aligner. The input data describing the teeth 302 can, for example, include the digital models of the teeth; digital models of rigid tissue structures, if available; shape and viscosity specifications for a highly viscous fluid modeling the substrate tissue in which the teeth are embedded and to which the teeth are connected, in the absence of specific models of those tissues; and/or boundary conditions specifying the immovable boundaries of the model elements. In one implementation, the model elements include only models of the teeth, a model of a highly viscous embedding substrate fluid, and boundary conditions that define, in effect, a rigid container in which the modeled fluid is held.

A finite element model of the initial configuration of the teeth and/or tissue can be created (step 310) and optionally cached for reuse in later iterations of the process (step 320). As was done with the teeth and tissue, a finite element model can be created of the polymeric shell aligner (step 330). The input data for this model can include data specifying the material of which the aligner is made and/or the shape of the aligner (data input 304).

The model aligner can then be computationally manipulated to place it over the modeled teeth in the model jaw to create a composite model of an in-place aligner (step 340). Optionally, the forces required to deform the aligner to fit over the teeth, including any hardware attached to the teeth, can be computed and, for example, used as a figure of merit in measuring the acceptability of the particular aligner configuration. In an alternative, however, the aligner deformation can be modeled by applying enough force to its insides to make it large enough to fit over the teeth, placing the model aligner over the model teeth in the composite model, setting the conditions of the model teeth and tissue to be infinitely rigid, and/or allowing the model aligner to relax into position over the fixed teeth. The surfaces of the aligner and the teeth can be modeled to interact without friction at this stage, so that the aligner model achieves the correct initial configuration over the model teeth before finite element analysis is begun to find a solution to the composite model and/or compute the movement of the teeth under the influence of the distorted aligner.

In various embodiments where a number of ribs are provided, the ribs can be modeled digitally and/or the force calculations can be adjusted or calculated differently to account for the changes in force the ribs may provide. Such changes may allow a tooth to be moved more quickly, a tooth position to be maintained against greater or longer duration force, and/or moved for a longer duration.

Figure 4:
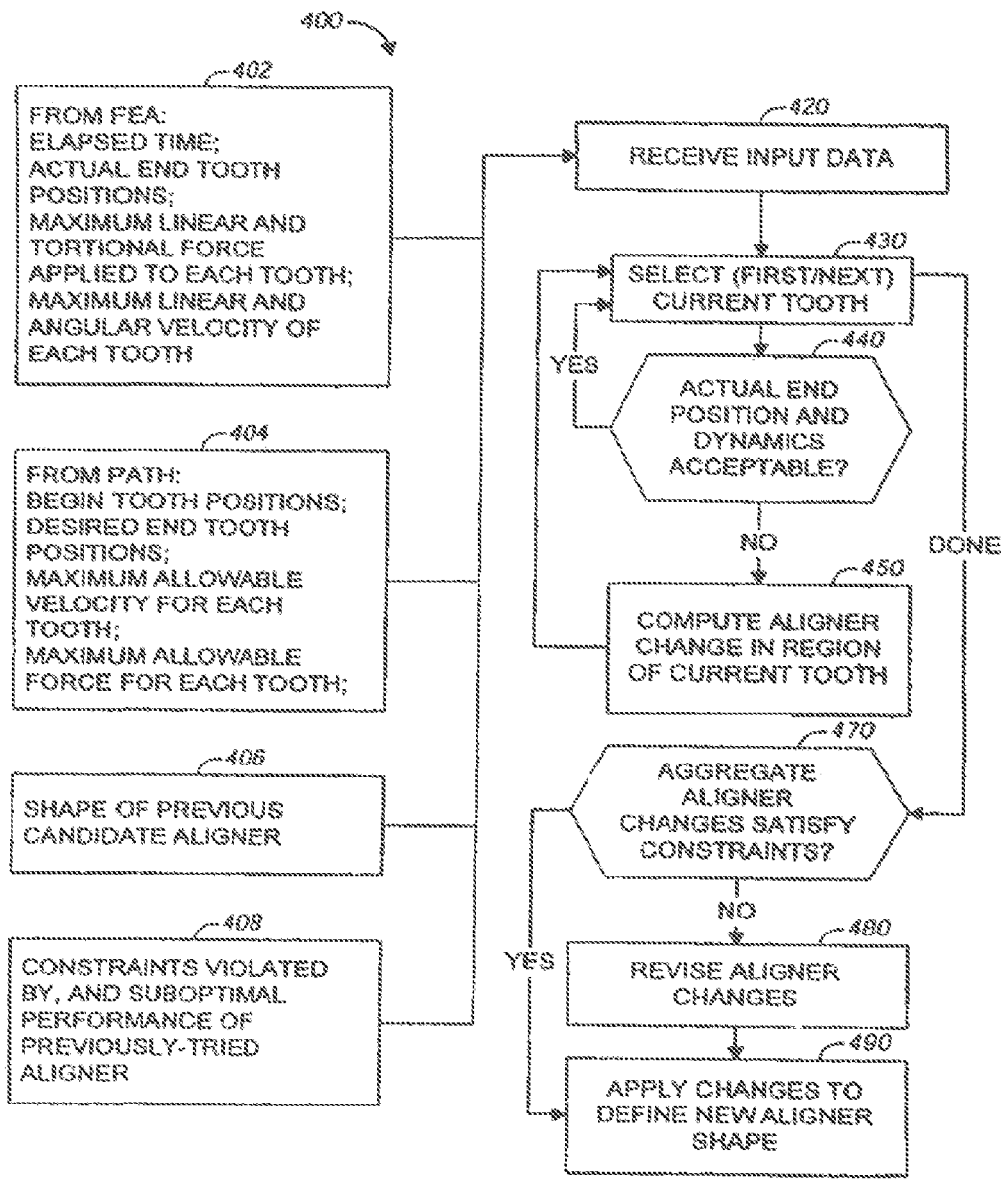
FIG. 4 is a flowchart of a subprocess for computing aligner changes according to an embodiment of the present disclosure.

FIG. 4 shows a process 400 for calculating the shape of a next aligner that can be used in the aligner calculations, step 240 of process 200 (FIG. 2). A variety of inputs can be used to calculate the next candidate aligner shape. These include inputs 402 of data generated by the finite element analysis solution of the composite model and/or data 404 defined by the current tooth path, among other information. The data 402 derived from the finite element analysis can, for example, include the amount of real elapsed time over which the simulated repositioning of the teeth took place; the actual end tooth positions calculated by the analysis; the maximum linear and torsional force applied to each tooth; and/or the maximum linear and angular velocity of each tooth. From the input path information, the input data 404 can, for example, include the initial tooth positions for the current path segment, the desired tooth positions at the end of the current path segment, the maximum allowable displacement velocity for each tooth, and/or the maximum allowable force of each kind for each tooth.

If a previously evaluated aligner was found to violate one or more constraints, additional input data 406 can be used by the process 400. This data 406 can include information identifying the constraints violated by, and any identified suboptimal performance of, the previously evaluated aligner.

Having received initial input data (step 420), the process can iterate over the movable teeth in the model. (Some of the teeth may be identified as, and constrained to be, immobile.) If the end position and/or dynamics of motion of the currently selected tooth by the previously selected aligner are acceptable ("yes" branch of decision step 440), the process can continue, for example, by selecting for consideration a next tooth (step 430) until all teeth have been considered ("done" branch from step 430 to step 470). Otherwise ("no" branch from step 440), a change in the aligner can be calculated in the region of the currently selected tooth (step 450). The process then can move back to select the next current tooth (step 430) as has been described.

In some embodiments, when all of the teeth have been considered, the aggregate changes made to the aligner can be evaluated against previously defined constraints (step 470), examples of which have already been mentioned. Constraints can be defined with reference to a variety of further considerations, such as manufacturability. For example, constraints can be defined to set a maximum and/or minimum thickness of the aligner material, and/or to set a maximum and/or minimum coverage of the aligner over the crowns of the teeth. In such embodiments, if the aligner constraints are satisfied, the changes are applied to define a new aligner shape (step 490). In some such embodiments, the changes to the aligner are revised to satisfy the constraints (step 480), and the revised changes are applied to define the new aligner shape (step 490).

Figure 5A:
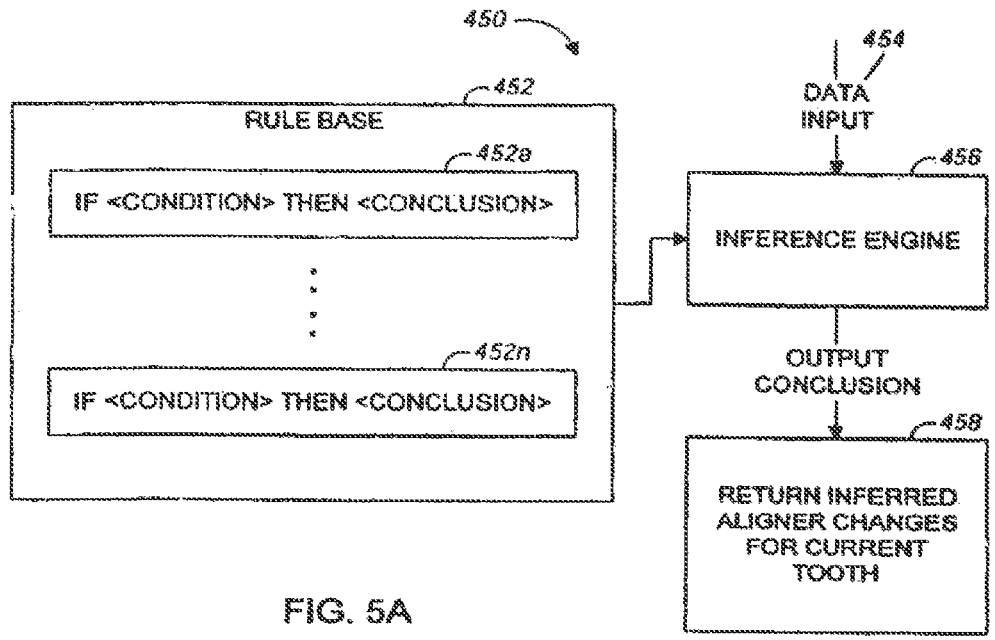
FIG. 5A is a flowchart of a subprocess for calculating changes in aligner shape according to an embodiment of the present disclosure.

FIG. 5A illustrates one implementation of the step of computing an aligner change in a region of a current tooth (step 450). In this implementation, a rule-based inference engine 456 can be used to process the input data previously described (input 454) and/or a set of rules 452a-452n in a rule base of rules 452. The inference engine 456 and the rules 452 can be used to define a production system which, when applied to the factual input data, can be used to produce a set of output conclusions that specify the changes to be made to the aligner in the region of the current tooth (output 458).

Rules 452 have the conventional two-part form: an if-part defining a condition and a then-part defining a conclusion or action that is asserted if the condition is satisfied. Conditions can be simple or they can be complex conjunctions or disjunctions of multiple assertions. An example set of rules, which defines changes to be made to the aligner, can, for example, include the following: if the motion of the tooth is too slow, add driving material to the aligner opposite the desired direction of motion; if the motion of the tooth is too slow, add driving material to overcorrect the position of the tooth; if the tooth is too far short of the desired end position, add material to overcorrect; if the tooth has been moved too far past the desired end position, add material to stiffen the aligner where the tooth moves to meet it; if a maximum amount of driving material has been added, add material to overcorrect the repositioning of the tooth and do not add driving material; and/or if the motion of the tooth is in a direction other than the desired direction, remove and add material so as to redirect the tooth, among other rules.

In another embodiment, illustrated in FIGS. 5B and 5C, an absolute configuration of the aligner can be computed, rather than an incremental difference. As shown in FIG. 5B, a process 460 can be used to compute an absolute configuration for an aligner in a region of a current tooth. Using input data that has already been described, such a process can compute the difference between the desired end position and the achieved end position of the current tooth (462). Using the intersection of the tooth center line with the level of the gum tissue as the point of reference, such a process can compute the complement of the difference in any or all six degrees of freedom of motion, namely three degrees of translation and/or three degrees of rotation (step 464). Next, in some embodiments, the model tooth can be displaced from its desired end position by the amounts of the complement differences (step 466), which is illustrated in FIG. 5D.

FIG. 5D shows a planar view of an illustrative model aligner 60 over an illustrative model tooth 62. The tooth is illustrated in its desired end position and the aligner shape is illustrated as being defined by the tooth in this end position. The actual motion of the tooth calculated by the finite element analysis can be illustrated as placing the tooth in position 64 rather than in the desired position 62. A complement of the computed end position can be illustrated as position 66. The next step of process 460 (FIG. 5B) defines the aligner in the region of the current tooth in this iteration of the process by the position of the displaced model tooth (step 468) calculated in the preceding step (466). This computed aligner configuration in the region of the current tooth is illustrated in FIG. 5D as shape 68 which is defined by the repositioned model tooth in position 66.

A step in process 460, which can also be implemented as a rule 452 (FIG. 5A), is shown in FIG. 5C. To move the current tooth in the direction of its central axis, the size of the model tooth defining that region of the aligner, or the amount of room allowed in the aligner for the tooth, can be made smaller in the area away from which the process has decided to move the tooth (step 465).

As shown in FIG. 6, the process 200 of computing the shape for an aligner for a step in a treatment path can be one step in an overall process 600 of computing the shapes of a series of aligners. This overall process 600 can, for example, begin with an initialization step 602 in which initial data, control, and/or constraint values can be obtained.

In some embodiments, when an aligner configuration has been found for each step or segment of the treatment path (step 604), the overall process 600 can be used to determine whether one or more of the aligners are acceptable (step 606). In some embodiments, if they are, the process exits and is complete. In some embodiments, the process can undertake a set of steps 610 in an attempt to calculate a set of acceptable aligners. In such embodiments the process can, relax one or more of the constraints on the aligners (step 612). Then, for each path segment with an unacceptable aligner, the process 200 of shaping an aligner can be performed with the new constraints (step 614). If the aligners are now acceptable, the overall process 600 can be exited (step 616).

Aligners may be unacceptable for a variety of reasons, some of which can be handled by the overall process in such embodiments. For example, if any impossible movements were required (decision step 620), that is, if the shape calculation process 200 was required to effect a motion for which no rule or adjustment was available, the process 600 can proceed to execute a module that can calculate the configuration of a hardware attachment to the subject tooth to which forces can be applied to effect such a required motion (step 640). Because adding hardware can have an effect that is more than local, when hardware is added to the model, in such instances, the outer loop of the overall process 600 can be executed again (step 642).

If no impossible movements were required ("no" branch from step 620), the process can transfer control to a path definition process (such as step 150, FIG. 1) to redefine those parts of the treatment path having unacceptable aligners (step 630). This step can include both changing the increments of tooth motion, i.e., changing the segmentation, on the treatment path, changing the path followed by one or more teeth in the treatment path, or both. In such embodiments, after the treatment path has been redefined, the outer loop of the overall process can be executed again (step 632). In some embodiments, the recalculation can be advantageously limited to recalculating only those aligners on the redefined portions of the treatment path. If all the aligners are now acceptable, the overall process can be exited (step 634). If unacceptable aligners still remain, the overall process can be repeated until an acceptable set of aligners is found or an iteration limit is exceeded (step 650). At this point, as well as at other points in the processes that are described in this specification, such as at the computation of additional hardware (step 640), the process can interact with a human operator, such as a clinician or technician, to request assistance (step 652). Assistance that an operator provides can include, for example, defining or selecting suitable attachments to be attached to a tooth and/or a bone, defining an added elastic element to provide a needed force for one or more segments of the treatment path, suggesting an alteration to the treatment path, either in the motion path of a tooth and/or in the segmentation of the treatment path, and/or approving a deviation from or relaxation of an operative constraint.

As was mentioned above, the overall process 600 can be defined and parameterized by various items of input data (step 602). In one implementation, this initializing and defining data includes the following items: an iteration limit for the outer loop of the overall process; specification of figures of merit that are calculated to determine whether an aligner is good enough (see FIG. 2, step 270); a specification of the aligner material; a specification of the constraints that the shape or configuration of an aligner must satisfy to be acceptable; a specification of the forces and positioning motions and velocities that are orthodontically acceptable; an initial treatment path, which includes the motion path for each tooth and a segmentation of the treatment path into segments, each segment to be accomplished by one aligner; a specification of the shapes and positions of any anchors installed on the teeth or otherwise; and a specification of a model for the jaw bone and other tissues in or on which the teeth are situated (in the implementation being described, this model includes of a model of a viscous substrate fluid in which the teeth are embedded and which has boundary conditions that essentially define a container for the fluid).

Figure 9:
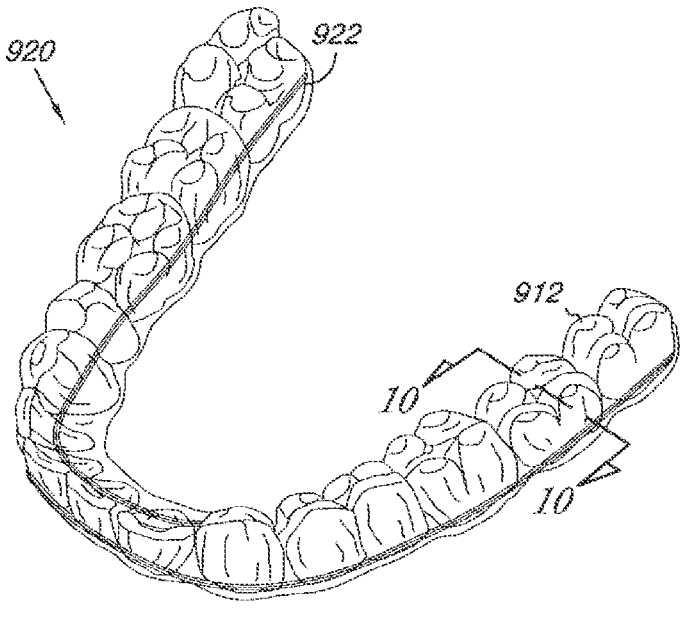
FIG. 9 illustrates an appliance having an inner and outer generally horizontal rib according to an embodiment of the present disclosure.
Figure 10:
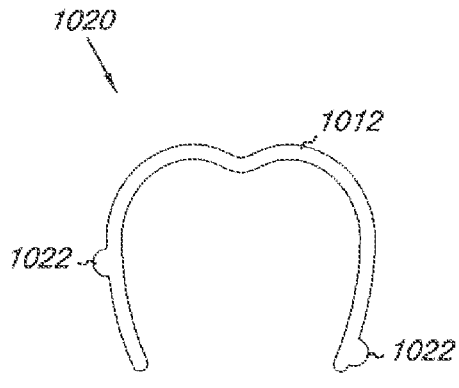
FIG. 10 illustrates an appliance cross-section illustrating the ribs as taken along line 10-10 of FIG. 9.

In various embodiments, other features can be added to the tooth model data sets to produce desired features in the aligners. For example, it may be desirable to add digital wax patches to define cavities or recesses to maintain a space between the aligner and particular regions of the teeth or jaw. It may also be desirable to add digital wax patches to define corrugated and/or other structural forms to create regions having particular stiffness and/or other structural properties. In manufacturing processes that rely on generation of positive models to produce the repositioning appliance, adding a wax patch to the digital model can be used to generate a positive mold that has the same added wax patch geometry. This can be done globally in defining the base shape of the aligners or in the calculation of particular aligner shapes. One feature that can be added, for example, is a rim around the gumline, which can be produced by adding a digital model wire at the gumline of the digital model teeth from which the aligner is manufactured. When an aligner is manufactured by pressure fitting polymeric material over a positive physical model of the digital teeth, the wire along the gumlines can be used to cause the aligner to have a rim around it providing additional stiffness along the gumline. Such an embodiment is illustrated in FIGS. 9 and 10.

In another optional manufacturing technique, two sheets of material can be pressure fit over the positive tooth model, where one of the sheets is cut along the apex arch of the aligner and the other is overlaid on top. Such an embodiment can provide a double thickness of aligner material along the vertical walls of the teeth, among other benefits.

The changes that can be made to the design of an aligner are, in many instances, constrained by the manufacturing technique that will be used to produce it. For example, if the aligner will be made by pressure fitting a polymeric sheet over a positive model, the thickness of the aligner is often determined by the thickness of the sheet. As a consequence, a system embodiment may generally adjust the performance of the aligner by changing the orientation of the model teeth, the sizes of parts of the model teeth, the position and/or selection of attachments, and/or the addition and/or removal of material (e.g., adding wires or creating dimples) to change the structure of the aligner. In such embodiments, the system can be designed to adjust the aligner by specifying that one or more of the aligners are to be made of a sheet of a thickness other than the standard one, to provide more or less force to the teeth. On the other hand, if the aligner will be made by a rapid prototyping technique (e.g., additive manufacturing process), such as by a stereo lithography process, photo lithography process, fused deposition modeling, selective laser sintering, or other such process, the thickness of the aligner can be varied locally, and structural features such as rims, dimples, and corrugations can be added without modifying the digital model of the teeth. Such methods can be used to form ribs as described in further detail herein, for example.

Such a system can also be designed to be used to model the effects of more traditional appliances such as retainers and braces and therefore be used to generate optimal designs and treatment programs for particular patients.

The data processing aspects of one or more of the embodiments of the present disclosure can be implemented in digital electronic circuitry, or in computer hardware, firmware, software, or in combinations of them. Data processing apparatus of one or more of the embodiments of the present disclosure can be implemented in a computer program product tangibly embodied in a machine-readable storage device for execution by a programmable processor; and data processing method steps of one or more of the embodiments of the present disclosure can be performed by a programmable processor executing a program of instructions to perform functions of one or more embodiments of the present disclosure by operating on input data and/or generating output. The data processing aspects of one or more of the embodiments of the present disclosure can be implemented advantageously in one or more computer programs that are executable on a programmable system including at least one programmable processor coupled to receive data and/or instructions from and/or to transmit data and/or instructions to a data storage system, at least one input device, and/or at least one output device. Each computer program can be implemented in a high-level procedural and/or object-oriented programming language, and/or in assembly and/or machine language, if desired; and, in any case, the language can be a compiled and/or interpreted language. Suitable processors include, by way of example, general and special purpose microprocessors, among other logic processing structures. Generally, a processor can receive instructions and/or data from a read-only memory and/or a random access memory. Storage devices suitable for tangibly embodying computer program instructions and/or data include all forms of nonvolatile memory, including by way of example semiconductor memory devices, such as EPROM, EEPROM, and flash memory devices; magnetic disks such as internal hard disks and removable disks; magneto-optical disks; and CD-ROM disks, and other such media types. Any of the foregoing can be supplemented by, or incorporated in, ASICs (application-specific integrated circuits).

To provide for interaction with a user, one or more of the embodiments of the present disclosure can be implemented using a computer system having a display device such as a monitor or LCD (liquid crystal display) screen for displaying information to the user and input devices by which the user can provide input to the computer system such as a keyboard, a two-dimensional pointing device such as a mouse or a trackball, or a three-dimensional pointing device such as a data glove or a gyroscopic mouse. The computer system can be programmed to provide a graphical user interface through which computer programs interact with users. The computer system can be programmed to provide a virtual reality, three-dimensional display interface, for use in some embodiments.

The present disclosure includes a number of appliance and system embodiments that include a number of ribs thereon. For example, embodiments can include a number of ribs for reinforcing the dental appliance regarding one or more forces (e.g., torsional, translational, and other types of force) as are discussed in more detail below.

For example, in various embodiments, the number of ribs can include a number of torsional reinforcing ribs for reinforcing the dental appliance regarding one or more torsional (i.e., twisting or rotational) forces. For instance, in some embodiments, the number of ribs includes a number of torsional reinforcing ribs that each provide reinforcing for the dental appliance regarding one or more torsional forces with respect to a line at the center of one of the number of apertures and elongate in a direction of a center of an adjacent tooth aperture.

As discussed above, embodiments can also be designed with respect to translational forces, such as side to side, front to back, back to front, up and down, and/or down and up with respect to the appliance shape and orientation. For example, in various embodiments, the number of ribs can include a number of perpendicular force reinforcing ribs for reinforcing the dental appliance regarding one or more forces perpendicular to a line at the center of one of the number of apertures and elongate in a direction of a center of an adjacent tooth aperture, among other forces. In some embodiments, the number of ribs includes a number of perpendicular force reinforcing ribs for reinforcing the dental appliance regarding one or more forces substantially perpendicular to a line at the center of one of the number of apertures and elongate in a direction of a center of an adjacent tooth aperture (e.g., the direction of elongation of the appliance).

Figures 7, 8A, 8B:
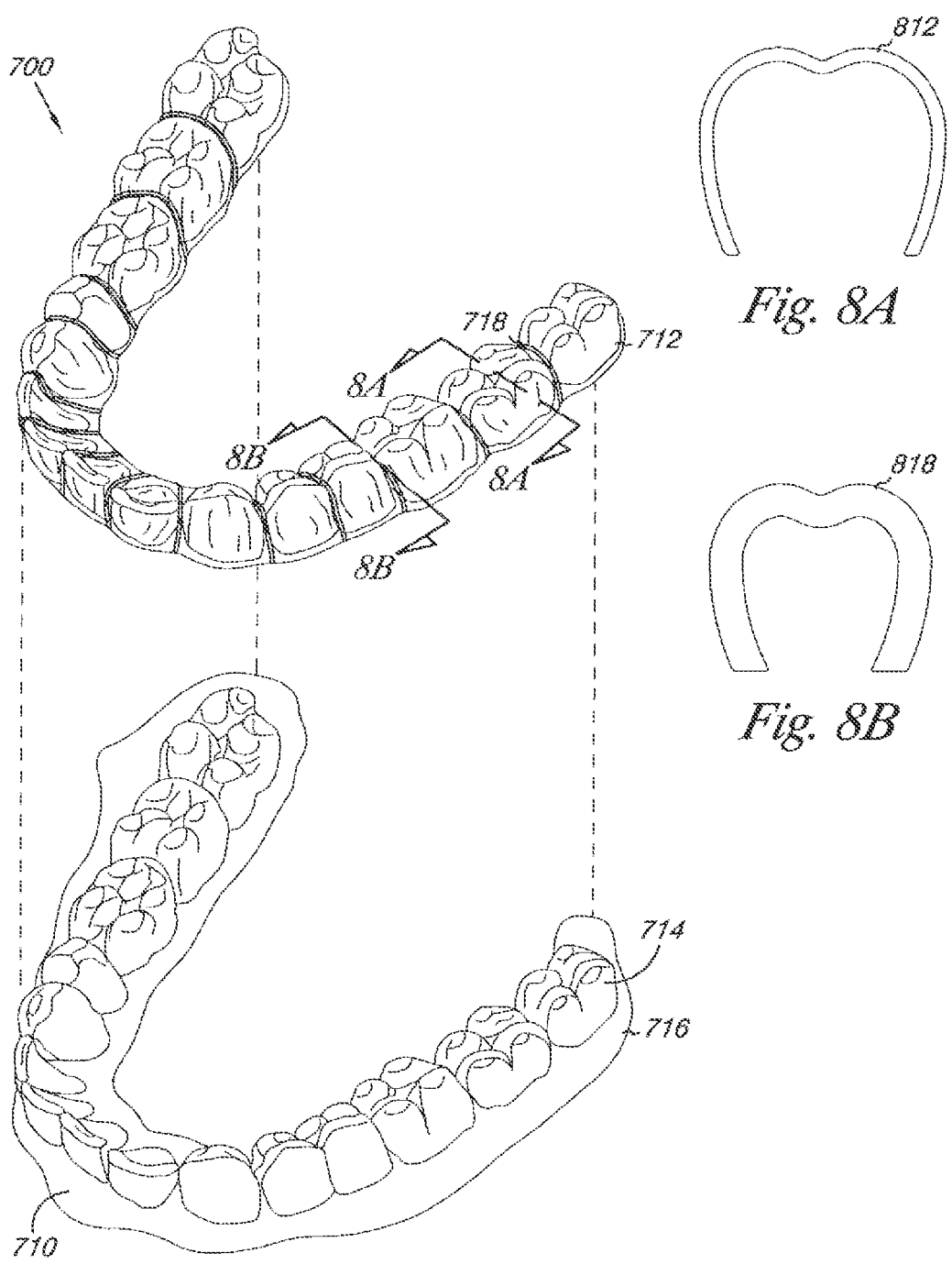
FIG. 7 illustrates an embodiment of an appliance and a set of teeth onto which the appliance is to be mounted.
FIG. 8A illustrates an appliance thickness as taken along line 2A-2A of FIG. 7.
FIG. 8B illustrates an appliance thickness as taken along line 2B-2B of FIG. 7.

FIG. 7 illustrates an embodiment of an appliance and a set of teeth onto which the appliance is to be mounted. In the embodiment if FIG. 7, the appliance 700 includes a number of apertures for the positioning of one or more teeth (e.g., teeth 714 on jaw 716 of patient 710) therein and a number of vertical ribs 718. As illustrated in FIG. 7, the number of tooth apertures can each include an interior surface and an exterior surface. In some embodiments one or more reinforcement ribs can be positioned along the exterior surface.

In various embodiments, the thickness of the ribs can vary from one portion of a rib to the next and/or can vary from one rib to the next. For example, in some embodiments, some ribs can be thicker where more force may be needed and thinner where less force may be needed. Additionally, although shown positioned in a spaced manner all along the length of elongation of the appliance, in some embodiments, the ribs can be positioned in one or more places along the length of the appliance rather than all along the length.

The ribs can have a number of sizes and/or shapes and can be sized and/or shaped differently from one portion of the rib to the next. In some embodiments, one or more of the ribs can be sized to not interfere with an interface surface of a dental appliance that is to abut a portion of the exterior surface of one of the number of tooth apertures.

In the embodiment of FIG. 7, the number of apertures each define an aperture for a single tooth, however, the embodiments of the present disclosure may have apertures to accommodate more than one tooth. Also, in the embodiment of FIG. 7, the number of ribs are each generally aligned vertically with respect to the direction of elongation of the appliance and are generally provided at or near the junction between apertures, however, the embodiments of the present disclosure may have ribs that are oriented horizontally or diagonally to the direction of elongation and/or are not positioned at or near the junctions between the apertures.

FIGS. 8A and 8B may aid in identifying one embodiment of a structure of a rib of an embodiment of the present disclosure. FIG. 8A illustrates an appliance thickness as taken along line 8A-8A of FIG. 7. This illustration provides a first thickness that in the embodiment of FIG. 7 provides the thickness for the majority of the appliance 812.

FIG. 8B illustrates an appliance thickness as taken along line 2B-2B of FIG. 7. This illustration provides a second thickness that in the embodiment of FIG. 7 provides the thickness for the ribs of the appliance 818. FIGS. 8A and 8B illustrate that the rib 818 has a thickness that is larger than the thickness of the 812.

Ribs can also be provided that have the same or smaller thickness than the other portions of the appliance. For example, a material or shape that is stiffer could be used as a rib material, in some embodiments, and may be thinner than the material used for other portions of the appliance.

As illustrated in the embodiment of FIG. 8B, at least a portion of one or more of the ribs can be positioned substantially vertically, along the height of the exterior surface of one of the number of tooth apertures. In some embodiments, one or more of the ribs can be positioned on the exterior surface of the dental appliance between two tooth apertures as is also illustrated in FIG. 8B.

In various embodiments, at least a portion of one or more of the ribs can be positioned, across a width of the exterior surface of one or more of the number of tooth apertures (e.g., along the outside surface of the appliance). In some embodiments, a rib can be positioned across the top of the aperture formed to accommodate a tooth (e.g., top portion of the U-shaped rib illustrated in FIG. 8B).

In some embodiments, at least a portion of one or more of the ribs can be positioned substantially vertically, along the height of the exterior surface of one or more of the number of tooth apertures (e.g., the side portions of the U-shaped rib illustrated in FIG. 8B) and/or across a top of the exterior surface of one or more of the number of tooth apertures (e.g., side portions and top portion of the U-shaped rib illustrated in FIG. 8B). In various embodiments, one or more of the ribs is positioned on the exterior surface of the dental appliance between two teeth apertures as illustrated in the embodiment of FIG. 8B.

FIG. 9 illustrates an appliance having inner and outer generally horizontal ribs according to an embodiment of the present disclosure. As stated above, appliances can have one or more vertical, diagonal, and/or horizontal ribs or rib portions in such orientations (e.g., ribs having non-linear shapes) and the one or more ribs can be positioned on the inside, top, and/or outside of the exterior surface of the appliance. As shown in FIG. 8B a rib can include portions that are in one or more of those positions on the appliance (e.g., inside, top, and outside).

As illustrated in the embodiment of FIG. 9, in various embodiments, at least a portion of one or more of the ribs can be positioned substantially laterally, across a length of at least one exterior surface of the number of tooth apertures. As illustrated in the embodiment of FIG. 9, in some embodiments, one or more of the ribs can be positioned to span across at least the exterior surfaces of more than one tooth apertures. Such embodiments can provide extra reinforcement in some embodiments due to the rib working with the force of a neighboring portion of the appliance and/or the tooth housed therein.

FIG. 10 illustrates an appliance cross-section illustrating the ribs as taken along line 10-10 of FIG. 9. The embodiment of FIG. 10 includes ribs 1022 provided at various positions on the exterior surface of the appliance 1012.

Ribs can be provided in various shapes. As illustrated in the embodiment of FIG. 10, a rib can have a semicircular cross-section among other cross-sectional shapes. Other cross-sectional shapes can include, for instance, circle, ellipse, polygon, or irregular based shapes, among others. The different shapes can provide different characteristics with regard to reinforcement and other benefits that ribs provide to an appliance. And, accordingly, ribs can have different shapes and sizes as discussed above and/or portions of ribs can have different shapes and sizes.

The present disclosure also includes a number of method embodiments. For example, in some embodiments a method includes forming a virtual teeth model of one or more of a patient's teeth on a computing device. The method also includes forming a virtual dental appliance based upon information from the virtual teeth model. Method embodiments can also include forming a number of ribs on the virtual dental appliance based upon the shape of the virtual dental appliance.

The number of ribs are formed based upon information about force that the dental appliance may experience in a patient's mouth.

An actual appliance to be positioned within a patient's mouth can be formed based upon the virtual dental appliance forming in the computing device. In some such embodiments, the appliance including the number of ribs can be formed using a rapid prototyping process, such as stereo lithography process, as discussed herein.

In various embodiments, the appliance can be formed using a rapid prototyping process and a number of ribs can be attached to the appliance. Such attachment can be accomplished, for example, by weaving the rib through a number of apertures formed in the appliance, by attaching the rib at two or more points along its length with an adhesive (e.g., a UV curable adhesive), or through a thermoforming process where multiple layers are pressed together with at least a portion of the rib material in between two of the layers, among other mechanisms for attaching the rib to the appliance.

In various embodiments, the one or more ribs can be attached to the mold used to make the appliance and then the rib can be used to provide a shape on the appliance. In such embodiments, the rib on the appliance would be a raised portion that is shaped in the form of the rib that was attached to the mold. This attachment to the mold can be accomplished in any suitable manner including, but not limited to, frictional attachment, physical attachment (e.g., weaving, a locking arrangement of parts, etc.), adhesive attachment, or other attachment mechanisms.

In some embodiments, the number of ribs can all be made from one material. In various embodiments, the ribs and the appliance can be formed from the same material. In some embodiments, the actual appliance and the number of ribs are formed from different materials.

Unless explicitly stated, the method embodiments described herein are not constrained to a particular order or sequence. Additionally, some of the described method embodiments, or elements thereof, can occur or be performed at the same, or at least substantially the same, point in time.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the use of the terms "a", "an", "one or more", "a number of", or "at least one" are all to be interpreted as meaning one or more of an item is present. Additionally, it is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method comprising:

forming a virtual dental appliance based upon information from a virtual teeth model, the virtual teeth model representing a patient's teeth;

forming virtual ribs on the virtual dental appliance, wherein the virtual ribs are formed laterally across at least a portion of a lingual surface and a labial surface of the virtual dental appliance and each has an arch shape in accordance with the at least a portion of the lingual surface and the labial surface of the virtual dental appliance, wherein a thickness from rib to rib of the virtual ribs varies, such that thicker one or more ribs are arranged to apply greater force in one or more desired directions;

calculating a displacement of one or more teeth of the virtual teeth model based on forces applied by the virtual dental appliance, wherein the displacement accounts for changes in the forces applied on the one or more teeth of the virtual teeth model that the virtual ribs provide; and forming a dental appliance from a polymeric material based upon the virtual dental appliance, wherein the dental appliance includes ribs integrally formed with the dental appliance from the polymeric material and laterally across a lingual surface and a labial surface of the dental appliance based on the virtual ribs.

2. The method of claim 1, wherein the ribs are formed based upon information about force that the dental appliance may experience in a patient's mouth.

3. The method of claim 1, wherein forming the dental appliance includes using a rapid prototyping process.

4. The method of claim 1, wherein forming the dental appliance includes a thermoforming process.

5. A method forming a dental appliance, the method comprising:

forming a composite virtual model that includes a virtual shell placed on a virtual teeth model, wherein the virtual teeth model represents a patient's teeth and the virtual shell has a shape based upon information from the virtual teeth model;

forming virtual ribs on the virtual shell, wherein the virtual ribs are formed laterally across at least a portion of a lingual surface and a labial surface of the virtual shell and each has an arch shape in accordance with the at least a portion of the lingual surface and the labial surface of the virtual shell, wherein a thickness from rib to rib of the virtual ribs varies, such that thicker one or more ribs are arranged to apply greater force in one or more desired directions;

confirming that a displacement of one or more teeth of the virtual teeth model based on forces applied by the virtual shell on the virtual teeth model having the virtual ribs is sufficient according to predetermined conditions; and forming the dental appliance including a shell comprising a polymeric material based on the virtual shell, wherein the dental appliance includes ribs integrally formed with the dental appliance from the polymeric material and laterally across a lingual surface and a labial surface of the shell based on the virtual ribs.

6. The method of claim 5, wherein the ribs include a first rib and a second rib, wherein the first rib is at a different height of the shell than the second rib.

7. The method of claim 6, wherein the ribs are formed based on information about force that the dental appliance is predicted to experience in a patient's mouth.

8. The method of claim 6, wherein the dental appliance is a first dental appliance associated with a first segment of a treatment plan, the method further comprising:

forming a second virtual shell having a shape according to a second segment of the treatment plan;

forming second virtual ribs on the second virtual shell; and forming a second dental appliance including a second shell with second ribs based on the second virtual shell having the second virtual ribs.

9. A method forming a dental appliance, the method comprising:

forming a virtual shell based upon information from a virtual teeth model of a patient's teeth;

forming virtual ribs on the virtual shell, wherein the virtual ribs are formed laterally across at least a portion of a lingual surface and a labial surface of the virtual shell and each has an arch shape in accordance with the at least a portion of the lingual surface and the labial surface of the virtual shell, wherein a thickness from rib to rib of the virtual ribs varies, such that thicker one or more ribs are arranged to apply greater force in one or more desired directions;

calculating a displacement of one or more teeth of the virtual teeth model based on forces applied to the one or more teeth by the virtual shell with the virtual ribs; and forming the dental appliance including a shell comprising a polymeric material based on the virtual shell, wherein the dental appliance includes ribs integrally formed with the dental appliance from the polymeric material and laterally across a lingual surface and a labial surface of the shell based on the virtual ribs.

10. The method of claim 9, wherein the forces applied to the one or more teeth account for forces applied to the one or more teeth by the shell in combination with the forces applied to the one or more teeth by the virtual ribs.

11. The method of claim 9, wherein the virtual ribs include a first virtual rib and a second virtual rib, wherein the first virtual rib is formed laterally on an exterior the lingual surface of the shell, and the second virtual rib is formed on an exterior labial surface of the virtual shell, wherein each of the first and second virtual ribs spans more than one tooth aperture of the virtual shell.

12. The method of claim 9, wherein the virtual ribs modify the forces applied by the virtual shell on the virtual teeth model to increase movement of the one or more teeth of the virtual teeth model in the one or more desired directions.

13. The method of claim 9, wherein the virtual ribs include a first rib and a second rib, wherein the first rib is at a different height of the dental appliance than the second rib.

14. The method of claim 9, wherein the virtual ribs follow a contour of the lingual surface and the labial surface of the virtual shell.

15. The method of claim 9, wherein the virtual ribs are positioned laterally across a width of the virtual shell.

16. The method of claim 9, wherein forming the dental appliance includes a thermoforming process.

* * * * *